US012275552B2

(12) United States Patent
Hull

(10) Patent No.: US 12,275,552 B2
(45) Date of Patent: Apr. 15, 2025

(54) FOOD STORAGE LABELING DEVICE

(71) Applicant: Rayford Hull, Friendswood, TX (US)

(72) Inventor: Rayford Hull, Friendswood, TX (US)

( * ) Notice: Subject to any disclaimer, the term of this patent is extended or adjusted under 35 U.S.C. 154(b) by 123 days.

(21) Appl. No.: 18/207,531

(22) Filed: Jun. 8, 2023

(65) Prior Publication Data

US 2024/0409265 A1 Dec. 12, 2024

(51) Int. Cl.

*B41J 3/407* (2006.01)
*B42F 13/16* (2006.01)
*B42F 21/02* (2006.01)
*B65C 9/46* (2006.01)
*G09F 3/02* (2006.01)

(52) U.S. Cl.

CPC ............... *B65C 9/46* (2013.01); *B41J 3/4075* (2013.01); *B42F 13/16* (2013.01); *B42F 21/02* (2013.01); *G09F 3/02* (2013.01); *B42P 2221/04* (2013.01); *G09F 2003/0202* (2013.01)

(58) Field of Classification Search

CPC ......... B41J 3/4075; B42F 13/16; B42F 21/02; B42P 2221/04; B65C 9/46; G09F 2003/0202; G09F 2221/04

See application file for complete search history.

(56) References Cited

U.S. PATENT DOCUMENTS 5,917,995 A * 6/1999 Ota .......................... B41J 13/10 347/108
6,068,420 A * 5/2000 Austin ....................... B41J 2/32 400/690.1
7,040,822 B2 5/2006 Fries
7,793,696 B2 9/2010 Matsumoto
10,131,158 B2 11/2018 Kubota
D900,212 S 10/2020 Ozawa
2005/0067106 A1 3/2005 Melges
2006/0291935 A1 12/2006 Plecas
2008/0292380 A1 11/2008 Diulio
2013/0216290 A1 8/2013 Kimble
2013/0335498 A1* 12/2013 Janz ......................... B41J 3/445 347/110
2013/0341103 A1* 12/2013 Wang Keng Meng ...................... B41J 3/4075 101/483
2023/0020205 A1* 1/2023 Hull ..................... G06K 15/005

FOREIGN PATENT DOCUMENTS

CA 2481908 3/2005
CN 209971895 * 1/2020
WO 2018227595 * 12/2018

* cited by examiner

*Primary Examiner* — Christopher E Mahoney
*Assistant Examiner* — Marissa Ferguson-Samreth

(57) ABSTRACT

A food storage labelling device includes a binder that has a front cover, a back cover and a spine hingedly coupled between the front cover and the back cover. A label printer is attached to the back cover and the label printer has data storage for storing a database comprising a plurality of food which can be applied to a food storage container for identifying food contained within the food storage container. A plurality of pages is each disposed on the front cover of the binder and a table listing food items, numeric codes associated with the food items and the recommended method of storing the food items is printed on the pages. A plurality of dividers is interlaced between the plurality of pages for dividing the plurality of pages into food categories.

5 Claims, 9 Drawing Sheets

108 106 118 110 112 114 104 118 116 118 102

| Food Item | Code | R | F | P | Storage Tips and Comments |
|---|---|---|---|---|---|
| FISH | | | | | |
| Anchovies - Canned | 2310 | ✓ | ✓ | X | Refrigerate in airtight container. Freeze in airtight container or freezer bag. |
| Artic Char-Fresh | 2311 | ✓ | ✓ | X | Refrigerate on bottom shelf in airtight container. Freeze in airtight container or freezer bag. |
| Artic-Char - Smoked | 2312 | ✓ | ✓ | X | Refrigerate tightly wrapped in foil or plastic wrap. Freeze in airtight container or freezer bag. |
| Bluefish - Fresh | 2313 | ✓ | ✓ | X | Refrigerate on bottom shelf in airtight container. Freeze in airtight container or freezer bag. |
| Bluefish - Smoked | 2314 | ✓ | ✓ | X | Refrigerate tightly wrapped in foil or plastic wrap. Freeze in airtight container or freezer bag. |
| Carp-Fresh | 2315 | ✓ | ✓ | X | Refrigerate on bottom shelf in airtight container. Freeze in airtight container or freezer bag. |
| Carp-Smoked | 2316 | ✓ | ✓ | X | Refrigerate tightly wrapped in foil or plastic wrap. Freeze in airtight container or freezer bag. |
| Catfish - Fresh | 2317 | ✓ | ✓ | X | Refrigerate on bottom shelf in airtight container. Freeze in airtight container or freezer bag. |
| Catfish - Smoked | 2318 | ✓ | ✓ | X | Refrigerate tightly wrapped in foil or plastic wrap. Freeze in airtight container or freezer bag. |
| Cod- Fresh | 2319 | ✓ | ✓ | X | Refrigerate on bottom shelf in airtight container. Freeze in airtight container or freezer bag. |
| Cod- Smoked | 2320 | ✓ | ✓ | X | Refrigerate tightly wrapped in foil or plastic wrap. Freeze in airtight container or freezer bag. |
| Fish Broth | 2321 | ✓ | ✓ | X | Refrigerate in airtight container. Freeze in airtight container, leave room for expansion. |
| Fish Chowder | 2322 | ✓ | ✓ | X | Refrigerate in airtight container. Freeze in airtight container, leave room for expansion. |
| Fish Sticks | 2323 | ✓ | ✓ | X | Cook from frozen, do not thaw or refreeze. Refrigerate cooked sticks in covered container. |
| Flounder - Fresh | 2324 | ✓ | ✓ | X | Refrigerate on bottom shelf in airtight container. Freeze in airtight container or freezer bag. |
| Flounder-Smoked | 2325 | ✓ | ✓ | X | Refrigerate tightly wrapped in foil or plastic wrap. Freeze in airtight container or freezer bag. |
| Gefilte Fish - Bottled | 2326 | ✓ | ✓ | X | Cover fish with liquid from bottle, then refrigerate or freeze in airtight container/freezer bag. |
| grouper- Fresh | 2327 | ✓ | ✓ | X | Refrigerate on bottom shelf in airtight container. Freeze in airtight container or freezer bag. |
| Grouper- Smoked | 2328 | ✓ | ✓ | X | Refrigerate tightly wrapped in foil or plastic wrap. Freeze in airtight container or freezer bag. |
| Haddock - Fresh | 2329 | ✓ | ✓ | X | Refrigerate on bottom shelf in airtight container. Freeze in airtight container or freezer bag. |
| Haddock - Smoked | 2330 | ✓ | ✓ | X | Refrigerate tightly wrapped in foil or plastic wrap. Freeze in airtight container or freezer bag. |
| Halibut - Fresh | 2331 | ✓ | ✓ | X | Refrigerate on bottom shelf in airtight container. Freeze in airtight container or freezer bag. |
| Halibut- Smoked | 2332 | ✓ | ✓ | X | Refrigerate tightly wrapped in foil or plastic wrap. Freeze in airtight container or freezer bag. |
| Herring - Canned | 2333 | ✓ | ✓ | X | Refrigerate in airtight container. Freeze in airtight container or freezer bag. |

FIG. 8

FOOD STORAGE LABELING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to labelling devices and more particularly pertains to a new labelling device for labeling food items with an expiration date and storage instructions. The device includes a label printer incorporated into a binder and a plurality of data sheets disposed in the binder which contains a plurality of codes for storing various food items which can be entered into the label printer to print a label for a container storing food items.

(2) Description of Related Art Including Information Disclosed Under 37 CFR 1.97 and 1.98

The prior art relates to labelling devices including a variety of label printers that include handheld label printers and desktop label printers. In no instance does the prior art disclose a label printer mounted in a binder along with a plurality of data sheets that includes codes representing food items and storage instructions for the food items.

BRIEF SUMMARY OF THE INVENTION

An embodiment of the disclosure meets the needs presented above by generally comprising a binder that has a front cover, a back cover and a spine hingedly coupled between the front cover and the back cover. A label printer is attached to the back cover and the label printer has data storage for storing a database comprising a plurality of food which can be applied to a food storage container for identifying food contained within the food storage container. A plurality of pages is each disposed on the front cover of the binder and a table listing food items, numeric codes associated with the food items and the recommended method of storing the food items is printed on the pages. A plurality of dividers is interlaced between the plurality of pages for dividing the plurality of pages into food categories.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 8 is a top view of a page of an embodiment of the disclosure.

DETAILED DESCRIPTION OF THE INVENTION

Figure 1:
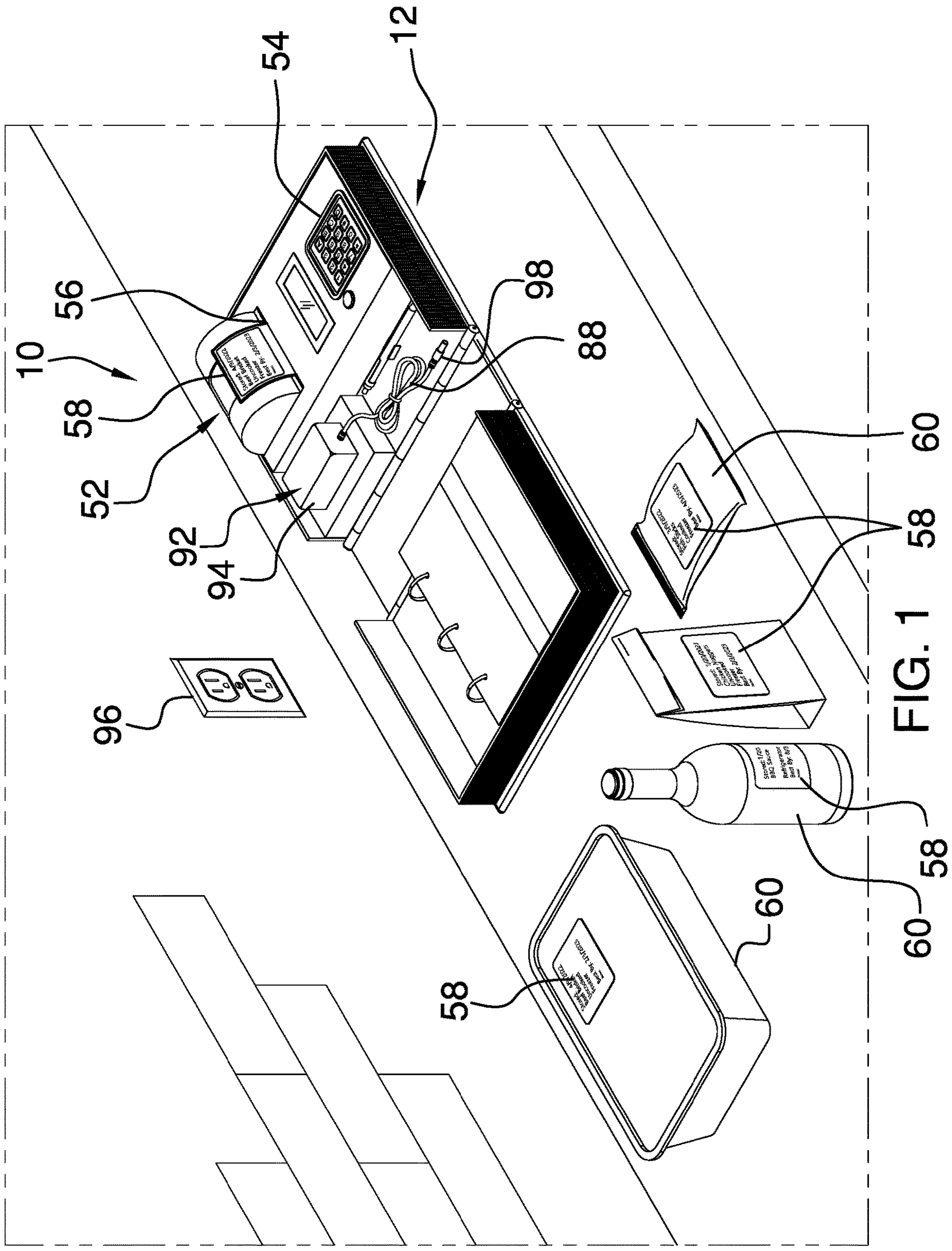
FIG. 1 is a perspective in-use view of a food storage labelling device according to an embodiment of the disclosure.
Figure 2:
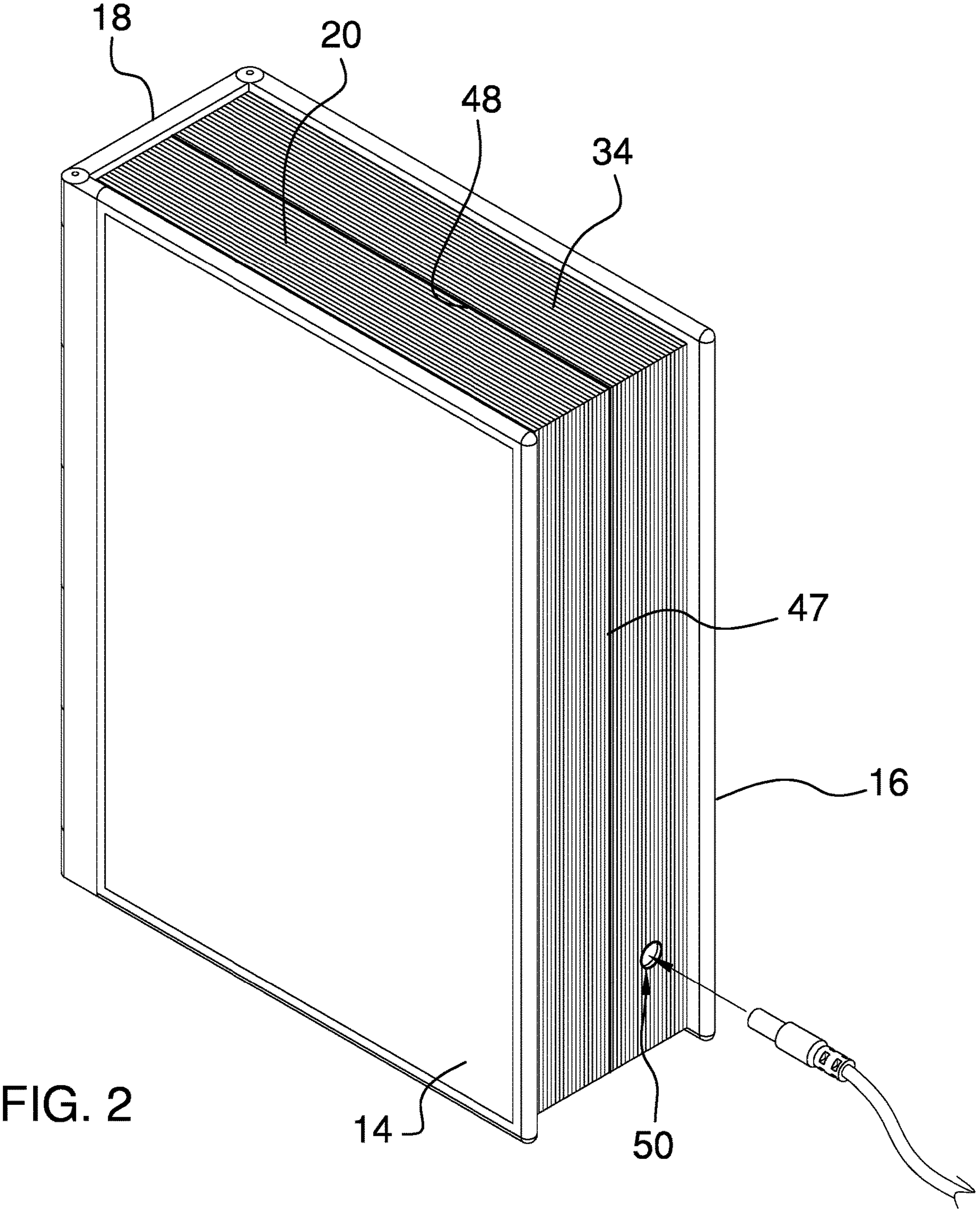
FIG. 2 is a front perspective view of an embodiment of the disclosure showing a binder in closed position.
Figure 3:
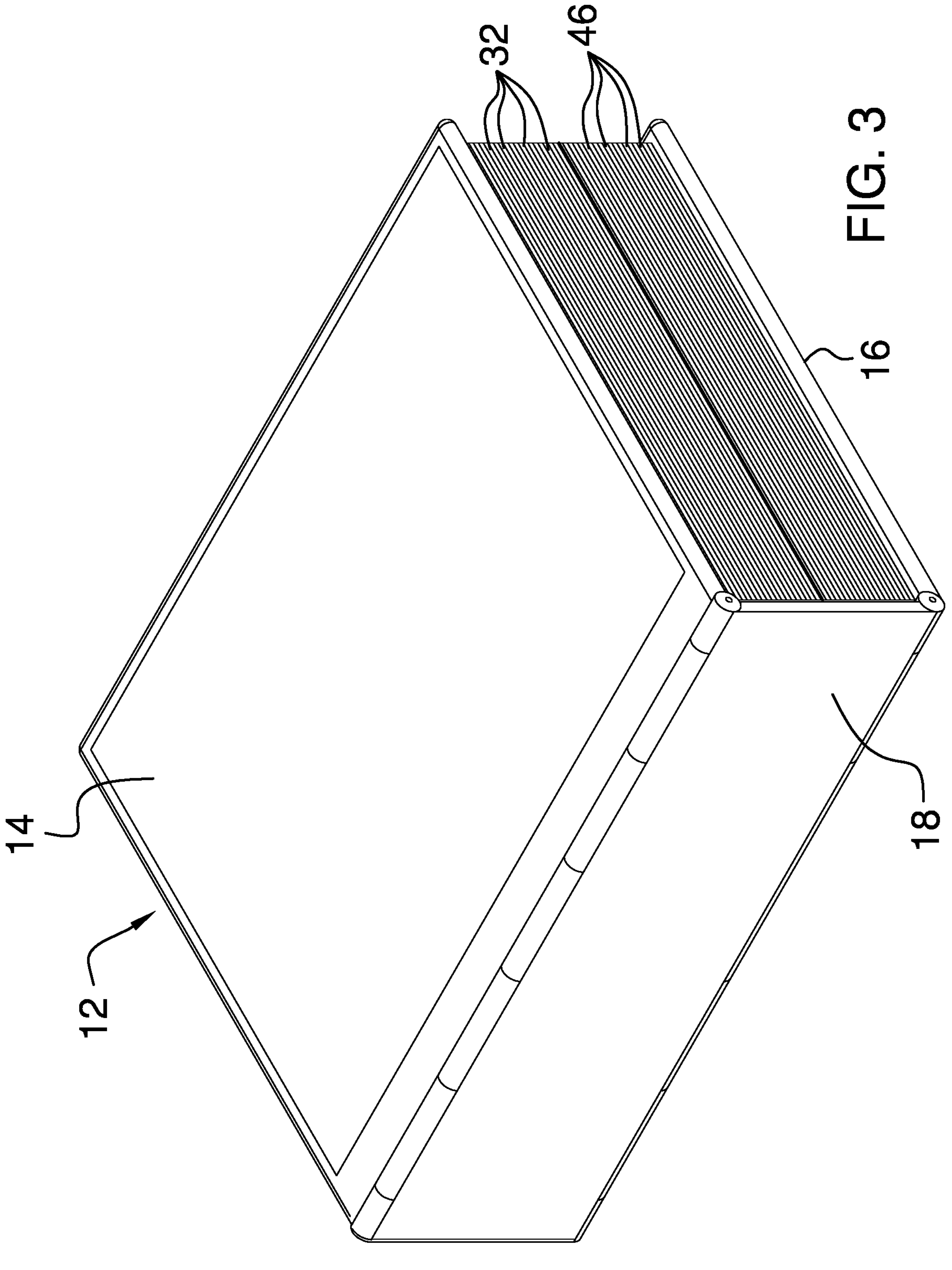
FIG. 3 is a back perspective view of an embodiment of the disclosure showing a binder in an open position.
Figure 4:
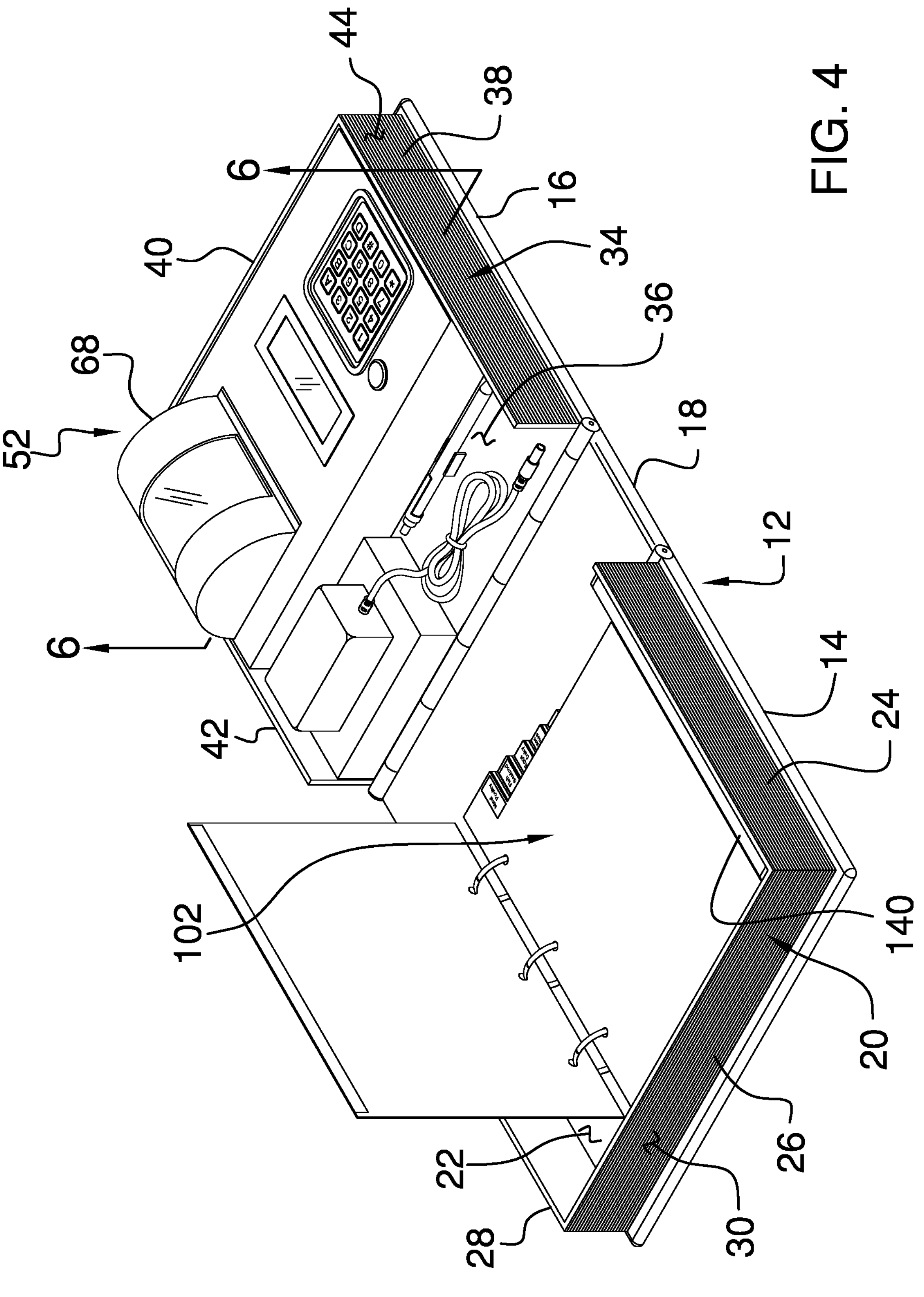
FIG. 4 is a top perspective view of a label printer of an embodiment of the disclosure.
Figure 5:
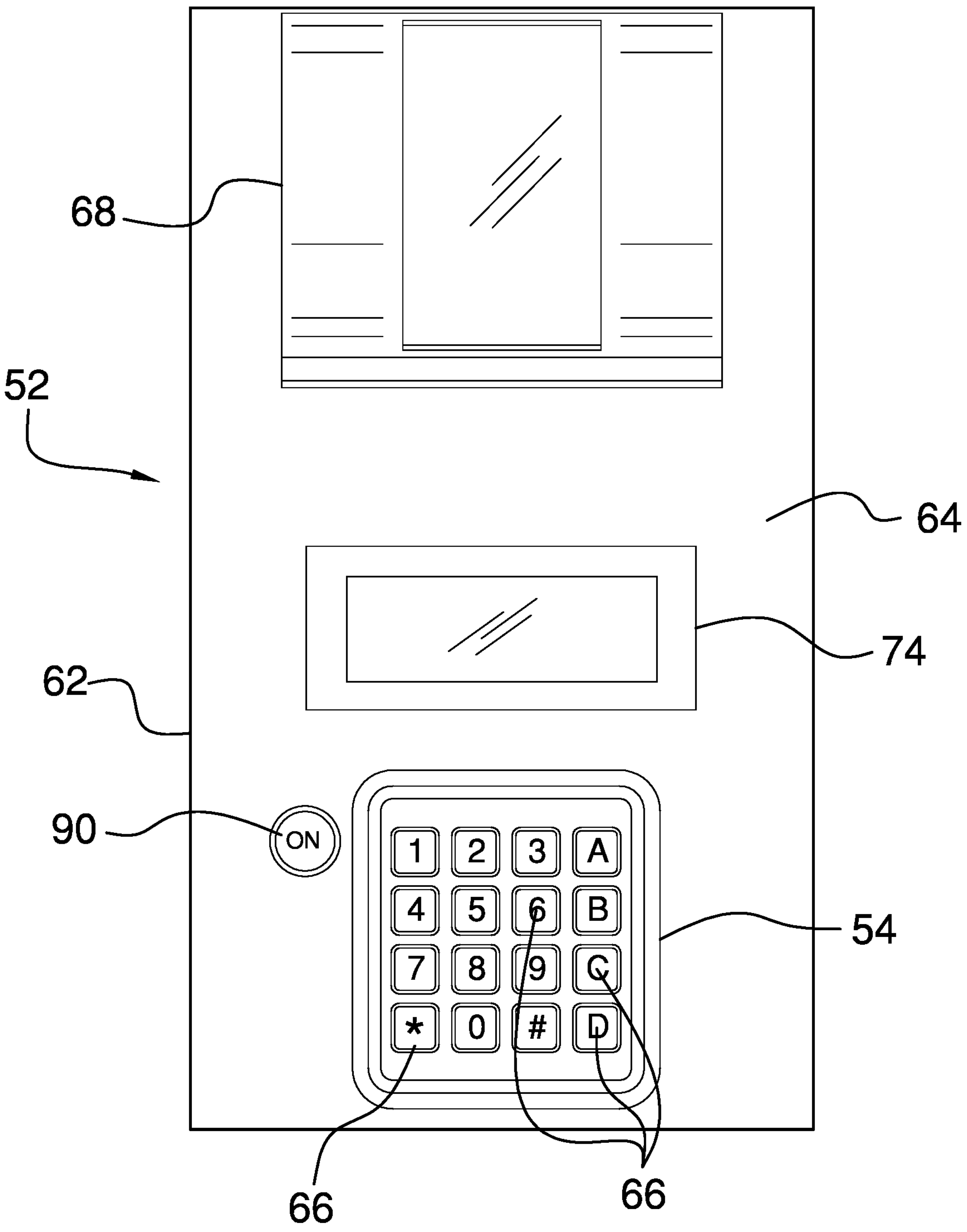
FIG. 5 is a top view of a label printer of an embodiment of the disclosure.
Figure 6:
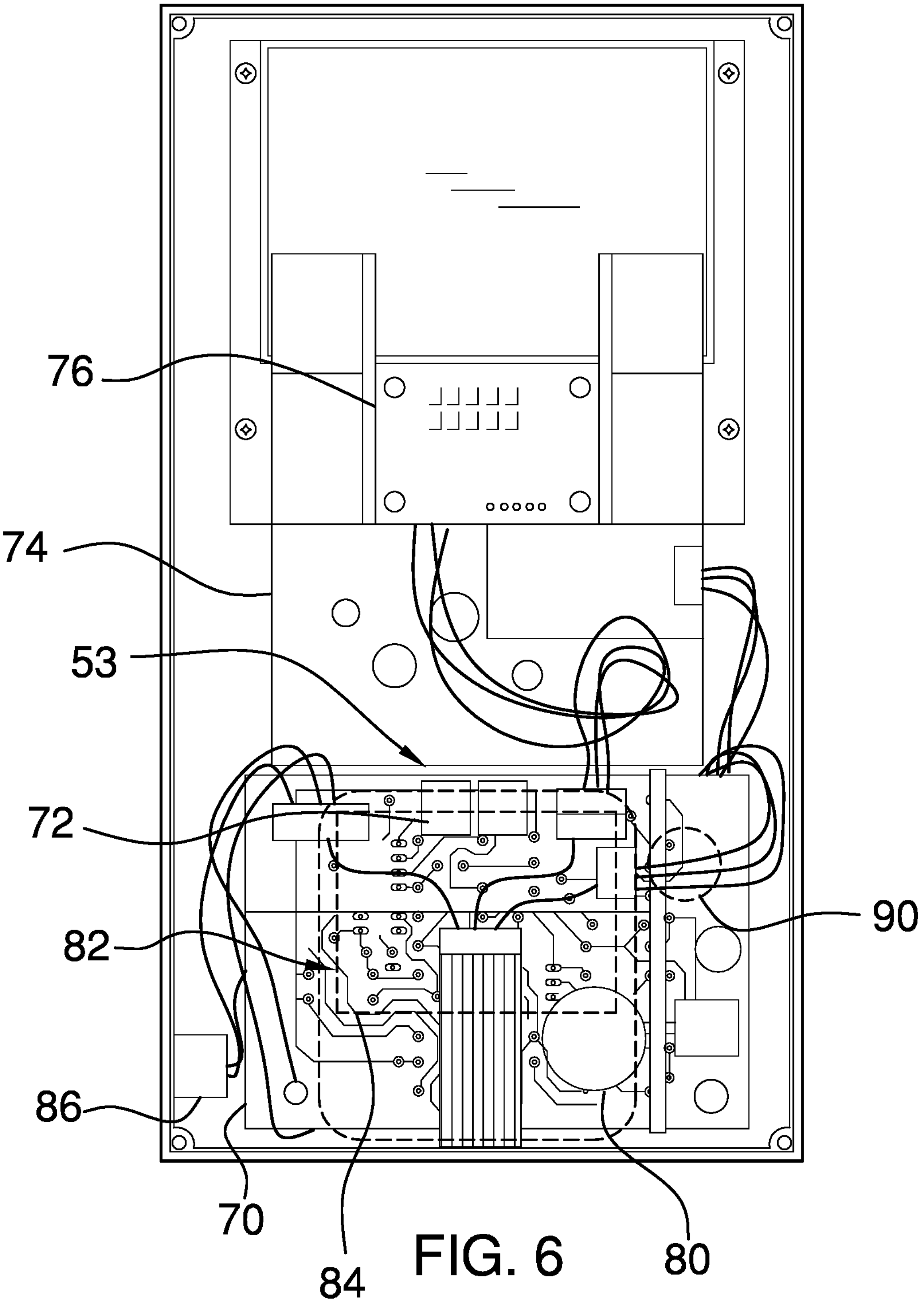
FIG. 6 is a cross sectional view taken along line 6-6 of FIG. 4 of an embodiment of the disclosure.
Figure 7:
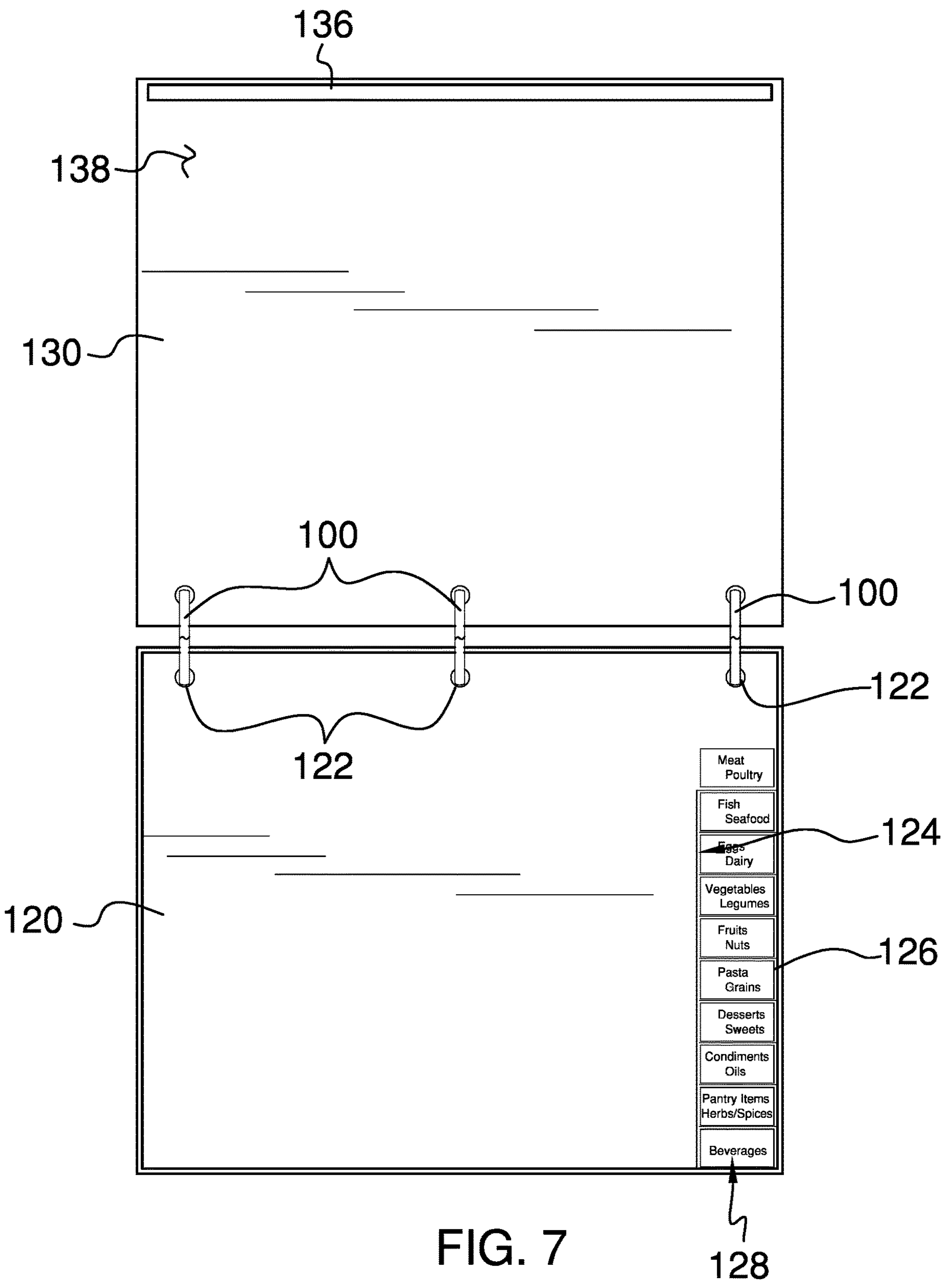
FIG. 7 is a top view of a plurality of pages of an embodiment of the disclosure.
Figure 9:
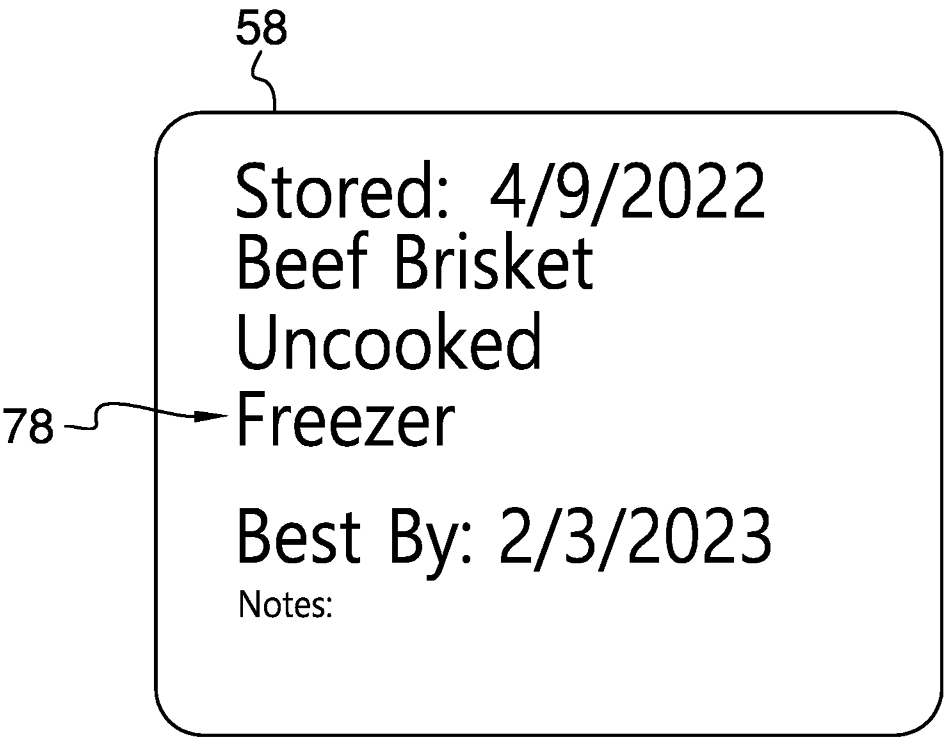
FIG. 9 is a top view of a label of an embodiment of the disclosure.

With reference now to the drawings, and in particular to FIGS. 1 through 9 thereof, a new labelling device embodying the principles and concepts of an embodiment of the disclosure and generally designated by the reference numeral 10 will be described.

As best illustrated in FIGS. 1 through 9, the food storage labelling device 10 generally comprises a binder 12 that has a front cover 14, a back cover 16 and a spine 18 hingedly coupled between the front cover 14 and the back cover 16. The front cover 14 has a perimeter wall 20 extending away from a rear surface 22 of the front cover 14 and the perimeter wall 20 has a front side 24, a first lateral side 26 and a back side 28. Additionally, the perimeter wall 20 has an outer surface 30 that is textured with a series of ridges 32 such that the perimeter wall 20 has the ornamental appearance of pages 102 in a book. The back cover 16 has a perimeter wall 34 extending away from a back surface 36 of the back cover 16 and the perimeter wall 34 associated with the back cover 16 has a front side 38, a first lateral side 40 and a back side 42. Additionally, the perimeter wall 34 associated with the back cover 16 has an outer surface 44 that is textured with a series of ridges 46 such that the perimeter wall 34 associated with the back cover 16 has the ornamental appearance of pages in a book. An upper edge 47 of the perimeter wall 20 associated with the front cover 14 abuts an upper edge 48 of the perimeter wall 34 associated with the back cover 16 when the binder 12 is closed. Additionally, the front side 38 of the perimeter wall 34 associated with the back cover 16 has a hole 50 extending through the front side 24 of the perimeter wall 20 associated with the back cover 16.

A label printer 52 is provided and the label printer 52 is attached to the back cover 16. The label printer 52 has a keyboard 54 and a printing output 56. Additionally, the label printer 52 has data storage 53 for storing a database which comprises a plurality of food items and instructions for freezing, refrigeration or storing at room temperature each of the food items. Furthermore, each of the plurality of food items is assigned a unique numeric code with respect to each other. The keyboard 54 is manipulated to enter the unique numeric code associated with a respective one of the food items such that the label printer 52 prints a label 58 that is released from the printing output 56. The label 58 can be applied to a food storage container 60 for identifying food contained within the food storage container 60. Additionally, The label printer 52 comprises a housing 62 that is attached to the back surface 36 of the back cover 16. The housing 62 has a top wall 64 and the keyboard 54 is positioned on the top wall 64; the keyboard 54 includes a plurality of alpha-numeric keys 66. Furthermore, the housing 62 has a dome 68 which rises upwardly from the top wall 64 and the printing output 56 is integrated into the dome 68. The label printer 52 includes a control circuit 70 that is positioned in the housing 62 and the control circuit 70 includes an electronic memory 72 which defines the data storage 53 associated with the label printer 52. Additionally, the keyboard 54 is electrically coupled to the control circuit 70.

The label printer 52 includes a display 74 that is attached to the top wall 64 of the housing 62. The display 74 is electrically coupled to the control circuit 70 such that the display 74 displays indicia comprising letters and numbers. Additionally, the display 74 may comprise a liquid crystal display or other type of electronic display. The label printer 52 includes a printer 76 that is integrated into the housing 62 and the printer 76 is positioned beneath the dome 68. The printer 76 is electrically coupled to the control circuit 70 and the printer 76 prints indicia 78 onto the label 58 which includes a storage date, the name of the food item, whether the food item is cooked or uncooked, whether the food item is being frozen, refrigerated or stored at room temperature and an expiration date of the food item. The label printer 52 includes an electronic clock 80 that is electrically coupled to the control circuit 70. The electronic clock 80 tracks the date and the time of day thereby facilitating the control circuit 70 to calculate the storage date of the food item and the expiration date of the food item. The plurality of alpha-numeric keys 66 includes a custom button 81 that prints a label 58 which has the current date onto the label 58 and nothing else. In this way the label 58 with the current date can be applied to a filter for a water purifier, for example, to indicate the date that the filter was replaced. In this way the service life of the filter, or any other type of object that is intended to be replaced on a repeating basis, can be tracked.

The label printer 52 includes a power supply 82 that is integrated into the housing 62 and the power supply 82 is electrically coupled to the control circuit 70. The power supply 82 comprises a rechargeable battery 84 that is electrically coupled to the control circuit 70. A charge port 86 is recessed into the housing 62 thereby facilitating the charge port 86 to insertably receive a charge cord 88 and the charge port 86 is electrically coupled to the rechargeable battery 84 for charging the rechargeable battery 84. The charge port 86 is aligned with the hole 50 in the front side 38 of the perimeter wall 34 associated with the back cover 16 of the binder 12. The power supply 82 includes a power switch 90 that is slidably integrated into the top wall 64 of the housing 62. The power switch 90 is electrically coupled to the control circuit 70 and the power switch 90 is slidable between an on position and an off position for turning the control circuit 70 on and off. A charger 92 is included that is stored in the binder 12 and the charger 92 includes a male plug 94 that can be plugged into a female electrical outlet 96 and a charging plug 98 that is electrically matable to the charge port 86 for charging the rechargeable battery 84.

A plurality of page rings 100 is each attached to the rear surface 22 of the front cover 14 of the binder 12. A plurality of pages 102 is each disposed on the front cover 14 of the binder 12 and each of the plurality of pages 102 has indicia 104 that is applied to the plurality of pages 102. The indica 104 associated with the plurality of pages 102 comprises a table 106 listing food items, numeric codes associated with the food items and the recommended method of storing the food items. As is most clearly shown in FIG. 8 the table 106 includes a column listing the food items 108, a column listing the numeric codes 110 that are each aligned with the respective food item, a column to indicate if each food item can be refrigerated 112, a column to indicate if each food item can be frozen 114 and a column listing instructions for storing each of the food items 116. Each of the plurality of pages 102 has a plurality of holes 118 which each insertably receives a respective one of the plurality of page rings 100 for retaining the plurality of pages 102 in the binder 12.

A plurality of dividers 120 is provided and each of the dividers 120 is interlaced between the plurality of pages 102 for dividing the plurality of pages 102 into food categories. Each of the plurality of dividers 120 has a plurality of holes 122 which each insertably receives a respective one of the plurality of page rings 100. Each of the dividers 120 has a cut out 124 located adjacent to a first lateral edge 126 of the dividers 120 and each of the plurality of dividers 120 has indicia 128 comprising words describing categories of food. The categories of food may include, but not be limited to, Meat Poultry, Fish, Seafood, Eggs, Dairy, Vegetable, Legumes, Fruits Nuts, Pasta, Grains, Desserts, Sweets, Condiments, Oils, Herbs/Spices and Beverages. The indicia 128 associated with each of the dividers 120 is positioned above the cut out 124 of the associated divider 120. Furthermore, the cut out 124 associated with each of the plurality of dividers 120 has a unique length with respect to each other such that the indicia 128 associated with each of the plurality of dividers 120 is visible.

A cover 130 is included which has a plurality of holes 132 that each insertably receives a respective one of the plurality of page rings 100. The cover 130 is positionable in a closed position having the cover 130 resting on a topmost one of the plurality of dividers 134. Additionally, the cover 130 is positionable in a closed position having the cover 130 exposing the topmost divider 134. A magnet 136 is attached to a bottom surface 138 of the cover 130 and the magnet 136 magnetically engages a ferromagnetic component 140 which is disposed on the topmost divider 134 for retaining the cover 130 in the closed position.

In use, the binder 12 is opened, the cover 130 is opened and a respective divider 120 is flipped up on the page rings 100 to expose the plurality of pages 102 that are related to the category of food items associated with the divider 120 that is flipped up on the page rings 100. The food item which corresponds to the food item in the food storage container 60 to locate the numeric code associated with the food item in the food storage container 60. The numeric code 110 associated with the food item in the food storage container 60 is entered with the alpha-numeric keys 66 on the keyboard 54. The label printer 52 subsequently prints a label 58 which includes the food item, the date the food item was placed in the food storage container 60 and the date by which the food item in the food storage container 60 should be consumed. The label 58 that is printed is placed on the food storage container 60 or bag or other type of package. In this way the food item that is stored in the food storage container 60 can be visually identified on the label 58 rather than having to open the food storage container 60. Thus, a plurality of food storage containers or bags or packages that are stored in a refrigerator, freezer or pantry can be readily identified as well as facilitating the expiration date of the food item in the food storage container 60, bag or package.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A food storage labelling device for logging cooked and uncooked food items and printing a label to indicate a shelf life of the cooked and uncooked food items, said device comprising:

a binder having a front cover, a back cover and a spine hingedly coupled between said front cover and said back cover;

a label printer being attached to said back cover, said label printer having a keyboard and a printing output, said label printer having data storage for storing a database comprising a plurality of food items and instructions for freezing or refrigerating or storing at room temperture each of said food items, each of said plurality of food items being assigned a unique numeric code with respect to each other, said keyboard being manipulated to enter said unique numeric code associated with a respective one of said food items such that said label printer prints a label being released from said printing output wherein said label is configured to be applied to a food storage container for identifying food contained within the food storage container;

a plurality of pages, each of said pages being disposed on said front cover of said binder, each of said plurality of pages having indicia being applied to said plurality of pages comprising a table listing food items and numeric codes associated with the food items and the recommended method of storing the food items;

a plurality of dividers, each of said dividers being interlaced between said plurality of pages for dividing said plurality of pages into food categories;

wherein said front cover has a perimeter wall extending away from a rear surface of said front cover, said perimeter wall having a front side, a first lateral side and a back side, said perimeter wall having an outer surface being textured with a series of ridges wherein said perimeter wall is configured to have the ornamental appearance of pages in a book;

wherein said back cover has a perimeter wall extends away from a back surface of said back cover, said perimeter wall associated with said back cover having a front side, a first lateral side and a back side, said perimeter wall associated with said back cover having an outer surface being textured with a series of ridges wherein said perimeter wall associated with said back cover is configured to have the ornamental appearance of pages in a book;

wherein an upper edge of said perimeter wall associated with said front cover abuts an upper edge of said perimeter wall associated with said back cover when said binder is closed;

wherein said front side of said perimeter wall associated with said back cover has a hole extending through said front side of said perimeter wall associated with said back cover;

wherein said device includes a plurality of page rings, each of said page rings being attached to said rear surface of said front cover of said binder:

wherein each of said plurality of pages has a plurality of holes which each insertably receives a respective one of said plurality of page rings for retaining said plurality of pages in said binder; and wherein each of said plurality of dividers has a plurality of holes which each insertably receives a respective one of said plurality of page rings.

2. The device according to claim 1, wherein said label printer comprises:

a housing being attached to said back surface of said back cover, said housing having a top wall, said keyboard being positioned on said top wall, said housing having a dome rising upwardly from said top wall, said printing output being integrated into said dome, said keyboard including a plurality of alpha-numeric keys;

a control circuit being positioned in said housing, control circuit including an electronic memory which defines said data storage associated with said label printer, said keyboard being electrically coupled to said control circuit;

a display being attached to said top wall of said housing, said display being electrically coupled to said control circuit such that said display displays indicia comprising letters and numbers;

a printer being integrated into said housing, said printer being positioned beneath said dome, said printer being electrically coupled to said control circuit, said printer printing indicia onto said label which includes a storage date and the name of the food item and whether the food item is cooked or uncooked and whether the food item is being frozen or refrigerated and an expiration date of the food item;

an electronic clock being electrically coupled to said control circuit, said electronic clock tracking the date and the time of day thereby facilitating said control circuit to calculate the storage date of the food item and the expiration date of the food item; and a power supply being integrated into said housing, said power supply being electrically coupled to said control circuit, said power supply comprising:

a rechargeable battery being electrically coupled to said control circuit;

a charge port being recessed into said housing thereby facilitating said charge port to insertably receive a charge cord, said charge port being electrically coupled to said rechargeable battery for charging said rechargeable battery, said charge port being aligned with said hole in said front side of said perimeter wall associated with said back cover of said binder; and a power switch being slidably integrated into said top wall of said housing, said power switch being electrically coupled to said control circuit, said power switch being slidable between an on position and an off position for turning said control circuit on and off.

3. The device according to claim 1, wherein:

each of said plurality of dividers has a plurality of holes which each insertably receives a respective one of said plurality of page rings;

each of said dividers has a cut out located adjacent to a first lateral edge of said dividers; and each of said plurality of dividers has indicia comprising words describing categories of food, said indicia associated with each of said dividers being positioned above said cut out of said associated divider, said cut out associated with each of said plurality of dividers having a unique length with respect to each other such that said indicia associated with each of said plurality of dividers is visible.

4. The device according to claim 1, further comprising a cover having a plurality of holes which each insertably receives a respective one of said plurality of page rings, said cover being positionable in a closed position having said cover resting on a topmost one of said plurality of dividers, said cover being positionable in a closed position having said cover exposing said topmost divider.

5. A food storage labelling device for logging cooked and uncooked food items and printing a label to indicate a shelf life of the cooked and uncooked food items, said device comprising:

a binder having a front cover, a back cover and a spine hingedly coupled between said front cover and said back cover, said front cover having a perimeter wall extending away from a rear surface of said front cover, said perimeter wall having a front side, a first lateral side and a back side, said perimeter wall having an outer surface being textured with a series of ridges wherein said perimeter wall is configured to have the ornamental appearance of pages in a book, said back cover having a perimeter wall extending away from a back surface of said back cover, said perimeter wall associated with said back cover having a front side, a first lateral side and a back side, said perimeter wall associated with said back cover having an outer surface being textured with a series of ridges wherein said perimeter wall associated with said back cover is configured to have the ornamental appearance of pages in a book, an upper edge of said perimeter wall associated with said front cover abutting an upper edge of said perimeter wall associated with said back cover when said binder is closed, said front side of said perimeter wall associated with said back cover having a hole extending through said front side of said perimeter wall associated with said back cover;

a label printer being attached to said back cover, said label printer having a keyboard and a printing output, said label printer having data storage for storing a database comprising a plurality of food items and instructions for freezing or refrigerating or storing at room temperature each of said food items, each of said plurality of food items being assigned a unique numeric code with respect to each other, said keyboard being manipulated to enter said unique numeric code associated with a respective one of said food items such that said label printer prints a label being released from said printing output wherein said label is configured to be applied to a food storage container for identifying food contained within the food storage container, said label printer comprising:

a housing being attached to said back surface of said back cover, said housing having a top wall, said keyboard being positioned on said top wall, said housing having a dome rising upwardly from said top wall, said printing output being integrated into said dome, said keyboard including a plurality of alpha-numeric keys;

a control circuit being positioned in said housing, control circuit including an electronic memory which defines said data storage associated with said label printer, said keyboard being electrically coupled to said control circuit;

a display being attached to said top wall of said housing, said display being electrically coupled to said control circuit such that said display displays indicia comprising letters and numbers;

a printer being integrated into said housing, said printer being positioned beneath said dome, said printer being electrically coupled to said control circuit, said printer printing indicia onto said label which includes a storage date and the name of the food item and whether the food item is cooked or uncooked and whether the food item is being frozen or refrigerated or stored at room temperature and an expiration date of the food item;

an electronic clock being electrically coupled to said control circuit, said electronic clock tracking the date and the time of day thereby facilitating said control circuit to calculate the storage date of the food item and the expiration date of the food item; and a power supply being integrated into said housing, said power supply being electrically coupled to said control circuit, said power supply comprising:

a rechargeable battery being electrically coupled to said control circuit;

a charge port being recessed into said housing thereby facilitating said charge port to insertably receive a charge cord, said charge port being electrically coupled to said rechargeable battery for charging said rechargeable battery, said charge port being aligned with said hole in said front side of said perimeter wall associated with said back cover of said binder; and a power switch being slidably integrated into said top wall of said housing, said power switch being electrically coupled to said control circuit, said power switch being slidable between an on position and an off position for turning said control circuit on and off;

a plurality of page rings, each of said page rings being attached to said rear surface of said front cover of said binder;

a plurality of pages, each of said pages being disposed on said front cover of said binder, each of said plurality of pages having indicia being applied to said plurality of pages comprising a table listing food items and numeric codes associated with the food items and the recommended method of storing the food items, each of said plurality of pages having a plurality of holes which each insertably receives a respective one of said plurality of page rings for retaining said plurality of pages in said binder;

a plurality of dividers, each of said dividers being interlaced between said plurality of pages for dividing said plurality of pages into food categories, each of said plurality of dividers having a plurality of holes which each insertably receives a respective one of said plurality of page rings, each of said dividers having a cut out located adjacent to a first lateral edge of said dividers, each of said plurality of dividers having indicia comprising words describing categories of food, said indicia associated with each of said dividers being positioned above said cut out of said associated divider, said cut out associated with each of said plurality of dividers having a unique length with respect to each other such that said indicia associated with each of said plurality of dividers is visible; and a cover having a plurality of holes which each insertably receives a respective one of said plurality of page rings, said cover being positionable in a closed position having said cover resting on a topmost one of said plurality of dividers, said cover being positionable in a closed position having said cover exposing said topmost divider.

* * * * *